Patented Dec. 23, 1924.

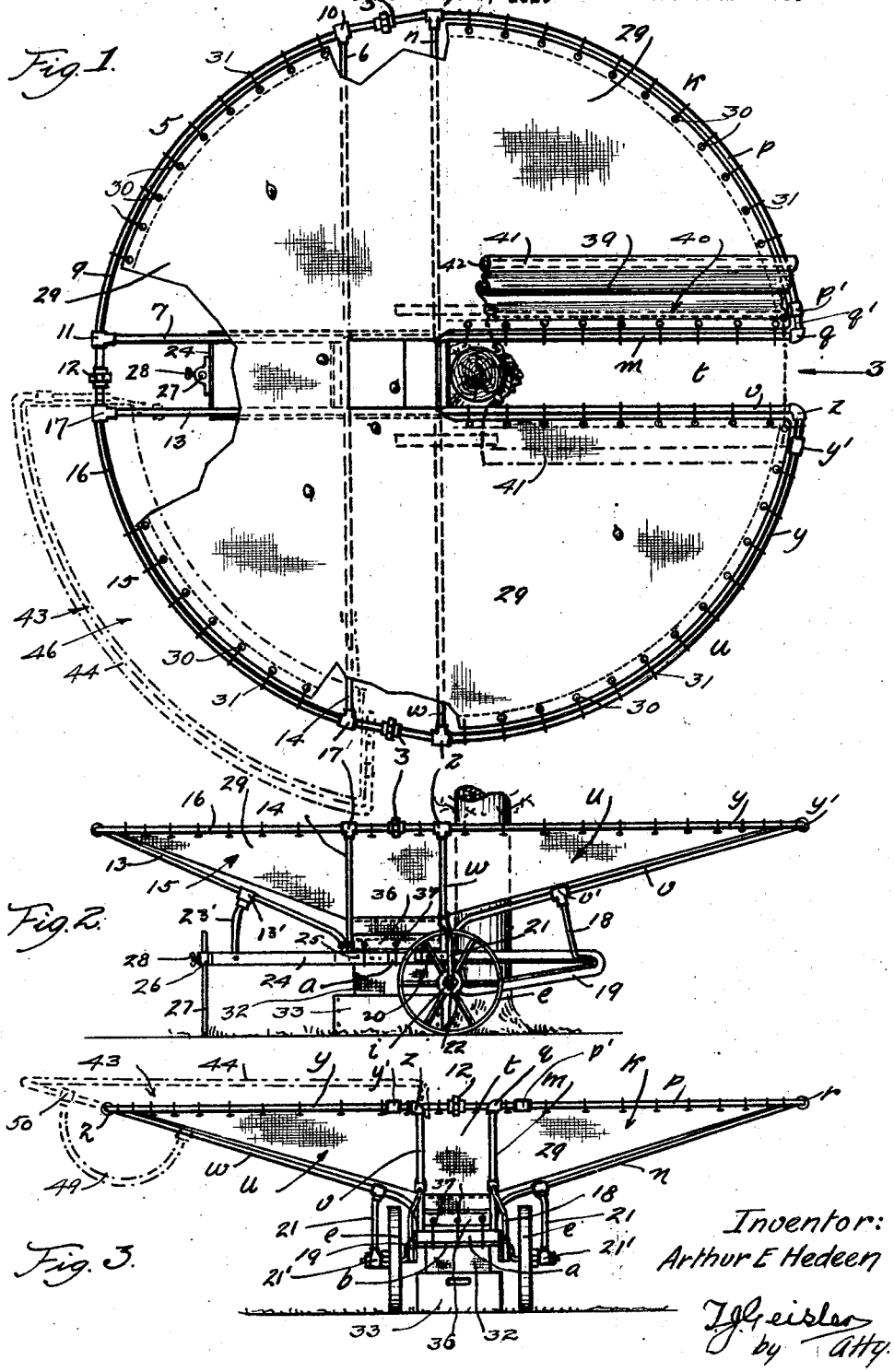

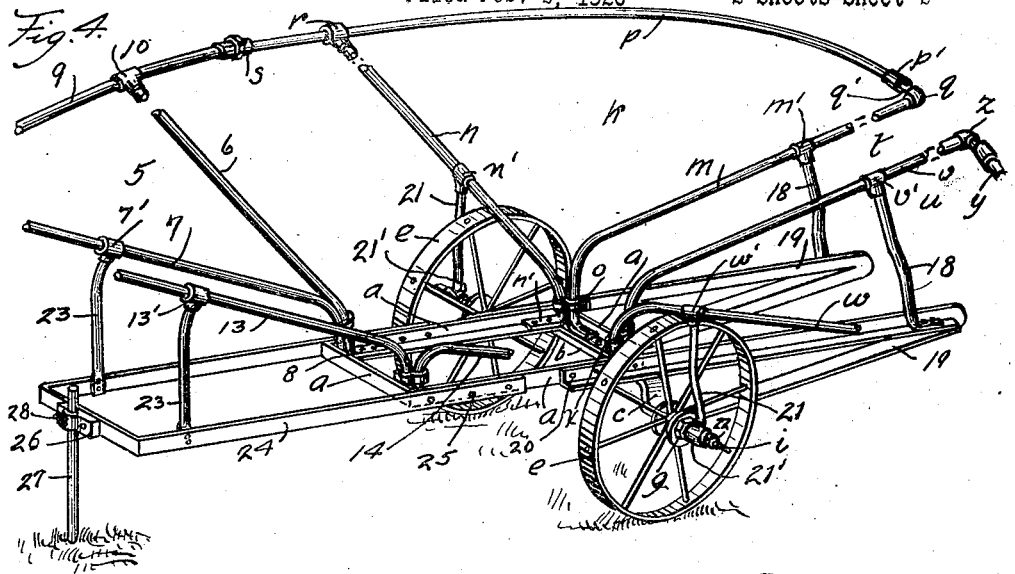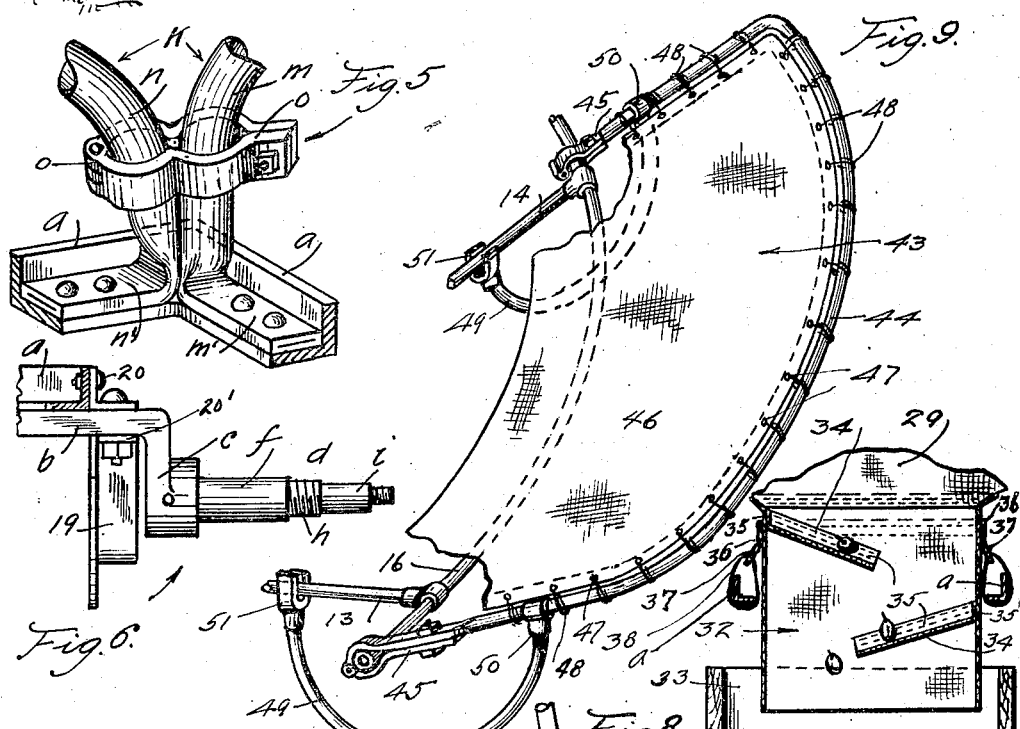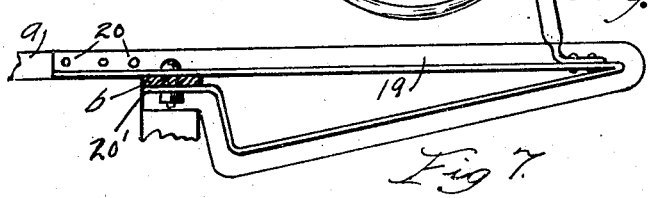

1,520,129

UNITED STATES PATENT OFFICE.

ARTHUR E. HEDEEN, OF PORTLAND, OREGON.

NUT AND FRUIT GATHERER.

Application filed February 2, 1920. Serial No. 355,629.

*To all whom it may concern:*

Be it known that I, ARTHUR E. HEDEEN, a citizen of the United States, residing at Portland, county of Multnomah, State of Oregon, have invented a new and useful Improvement in Nut and Fruit Gatherers, of which the following is a specification.

In harvesting the fruit from a prune tree, the usual way is to shake the limbs and cause the fruit to fall to the ground. It is then gathered up by hand-picking and placed in containers. From 15 to 30 per cent of the fruit is lost by being bruised in falling on the ground, or by being trampled on by the pickers. It is obvious that this is a very slow and inefficient method.

I am aware that several schemes have been devised for bettering these conditions of which a simple scheme is to spread a canvas under a tree.

Another method consists of having a portable canvas covered frame of two rectangular sections which is so arranged that the two sections may be placed one on each side of the tree, after which they are fastened together. These and other numerous schemes require the labor of two or more persons and the time spent in moving and setting up of same, makes the use of them almost prohibitive.

The object of my invention is to provide a device so constructed that it is light in weight, readily portable and easily placed in position under a tree by the efforts of only one person. The area of the same is equal to the area covered by the branches of the average tree and the surface of the receiving receptacle is soft and yielding so as not to bruise the fruit.

The design of the gatherer is such that all the fruit falling upon the same will roll by gravity toward a central opening where it falls into a container. A tube extends vertically downward and is provided with baffles which allow the fruit to gently and gradually fall into the container and thus receive practically no bruise.

I provide means for adjusting my device for an orchard which is planted on a hillside.

I also provide means for allowing my device to be expanded to a larger receiving area without altering the original device. The object of this is to be able to provide for trees of varying sizes and also for the reason that a machine, if made of too large a diameter, will not be substantial or readily manipulated between the trees.

My device is made in sections so that the same can be taken apart and made compact for storing, and each segment can be taken apart for compactness in shipping.

In the accompanying drawings:

Fig. 1 is a top plan view of my device set up to a tree;

Fig. 2 is a side elevation;

Fig. 3 is an end elevation looking in the direction of the arrow 3 in Fig. 1;

Fig. 4 is a fragmental perspective detail of the frame construction;

Fig. 5 is a detailed view of the method used in attaching the canvas supporting frame to the base of my device;

Fig. 6 is a detailed view of one side of my frame, supporting axle;

Fig. 7 is a detailed view of one of my frame supporting brackets;

Fig. 8 is a sectional view of the tube showing the baffles;

Fig. 9 is a perspective view of one of the attachments for enlarging the surface area of my device.

My device is constructed as follows:

$a$ is a rectangular angle iron base upon which my canvas supporting frames are mounted and provides for the opening thru which the fruit falls into the container.

The base $a$ is mounted at one end on the bar $b$ having at the ends the perpendicular offsets $c$, in which are rigidly mounted the axle members $d$. The wheels $e$ are mounted upon the portion $f$ of the axle member $d$ and held in position by a nut $g$ threaded on the portion $h$. The function of the outer portion $i$ is to provide for holding an upright brace which will be described later.

As was stated before, it is my object to provide a device that is so constructed that it can be taken apart as it is obvious that a device of such proportion cannot be readily shipped or stored away. To accomplish this, I construct the frame in four segments which can be mounted, one on each corner of the base $a$, and coupled together at the top forming a complete circle to which is secured the outer edge of the canvas.

Two of the segments are not coupled together to provide an opening thru which the tree passes when my device is set in the position for gathering the fruit.

In Figs. 1, 4 and 5, $k$ represents one of my frame segments consisting of the arms $m$ and $n$ which are flattened and bent at the ends, and bolted to the base $a$ at $m'$, $n'$ and held firmly together by means of a clamp $o$.

The curved member $p$ constitutes a segmental part of the canvas supporting rim of my frame and is threaded at one end into an elbow $q$ situated at the upper extremity of the arm $m$, while the other end passes thru a T as $r$ situated at the upper end of arm $n$ and has at the extremity a male section of the coupling $s$.

A union $p'$ allows the pipe $p$ to be disconnected from the elbow $q$ by means of a nipple $q'$. Thus the segment $k$ can readily be taken apart. The object of stopping the end of the rim member $p$ at the elbow $q$ is to provide for the opening $t$ thru which the tree passes when setting my device up to the same.

The frame segment $u$ (see Figs. 1 and 4) consists of the arms $v$ and $w$, bolted to the base $a$ at $x$ in like manner as the arms $m$ and $n$ in Fig. 4, and the rim member $y$ which is threaded at one end to the elbow $z$ situated at the upper end of the arm $v$, thus forming the opposite side of the opening $t$. The other end of the pipe member $y$ in Fig. 1, passes thru a T 2 situated at the upper end to the arm $w$ and is provided at the end with a male section of the coupling 3. A union $y'$ is provided to allow the pipe $y$ to be disconnected from the elbow $z$.

The frame segment 5 consists of the arms 6 and 7 which are mounted to the base $a$ at 8 in like manner as segment $k$ in Fig. 5. One end of the rim member 9 passes thru a T 10, situated at the upper end of arm 6 and is provided with a female portion of the coupling $s$, and thus forms the continuation of the rim member $p$.

The opposite end of the rim member 9 passes thru a T 11 (see Fig. 1) situated at the upper end of arm 7 and is provided with a male portion of the coupling 12.

The arms 13 and 14 of the segment 15 are mounted to the base $a$ in like manner as segment $k$ (Fig. 4) and one end of the rim member 16 passes thru a T 17 situated at the upper end of arm 13 and is provided with a female portion of the coupling 12. When coupled together, the rim member 16 is continuous with the member 9. The other end of member 16 passes thru a T 17' situated at top of arm 14, and is provided with a female portion of coupling 3 and thus the rim is complete.

To strengthen my frame and prevent the rim from sagging, I provide the uprights 18 mounted on the trusses 19 and secured to the arms $m$ and $v$ at $m'$ and $v'$ respectively.

The trusses 19 are bolted at one end to the sides of the base $a$ at 20 (see Figs. 4 and 7) and the other ends at 20' to the underside of the axle bar $b$.

The uprights 21 are secured at the upper ends to the arms $n$ and $w$ at $n'$ and $w'$, respectively, and the lower ends are threaded into T's 21' which are mounted on the portion $i$ (Fig. 6) of the axle members $f$ and held in place by nuts 22.

The uprights 23 are secured at the top ends to the arms 7 and 13 at 7' and 13' respectively, and are bolted at their lower ends to the member 24 which is either a continuation of the angle iron trusses 19 or is constructed as shown in Fig. 4 and bolted to base $a$ as at 25.

To allow the rim of my device to always lie in a horizontal plane such as when my device is on a hillside, I provide a member 26 rigidly secured to the end of member 24 and thru which slides a rod 27. A thumb screw 28 is provided for setting the same at the desired position.

A canvas net or covering 29 is cut and sewn to the desired shape and is provided at the edge with rings 30 in which rope stubs 31 or hooks are attached to secure the canvas to the rim.

When the canvas is completely mounted to the rim, it sets clear of the arms of the frame, as shown in Figs. 2 and 3, thus preventing any of the falling fruit from striking and bruising against any such frame member.

A square canvas tube 32 is sewn to the edge of the opening in the canvas to divert the fruit to the container 33 (see Fig. 8). To prevent the fruit from dropping from too high an elevation into the container and thus being bruised, I provide a series of baffles 34 made of canvas and sewn at the sides and edges to the tube 32 as at 35.

As seen in Fig. 8, the canvas strip 36 is sewn to the outer sides of the tube 32 and is provided with rings 37 in which are tied the rope stubs 38. These ropes are then tied to the sides of the base $a$ and thus holds the canvas firm upon the frame.

A canvas strip 39 (see Fig. 1) is sewn at one end to the canvas 29 at 40 and is provided at the other end with a loop 41 in which is securely placed an iron bar 42. When my device is set in position around a tree, the free end 41 of the canvas 39 is then lifted over the opening $t$, and laid down upon the canvas at the opposite side of the opening. The weight of the bar 42 holds this canvas strip 39 taut and thus diverts the fruit that falls upon the same to the container.

For enlarging the area of my device I provide for each segment, an extension frame 43 consisting of a pipe 44, bent as shown in Figs. 1 and 9, and having securely mounted on the bent ends the hinged clamps 45 for pivotally attaching the same to the rim of the segment of the main frame.

An auxiliary canvas strip 46 has rings 47 on the edges as shown to which are tied rope stubs 48 for attaching the canvas to the pipe 44. To hold the frame 43 in the extended position, I provide the curved rods 49 rigidly secured at one end to the pipe 44 at 50, and having at the other end the U-shaped members 51 which bear against the arms of the frame of my device.

When my device is to be moved to another tree, the extension frame 43 is folded over and allowed to rest upon the canvas of the main frame.

I claim:

1. In a fruit gatherer, an elongated main frame including parallel members spaced apart by a rectangular frame arranged slightly to one side of the longitudinal middle, one end of said main frame being closed and the other end being open so as to receive a tree trunk between them, a transverse shaft supporting said main frame substantially at its longitudinal middle, a plurality of vertically and laterally extended arms mounted on said rectangular spacing frame, and a main rim carried thereby, an extension rim affixed exteriorly of said main rim, the exterior rim being made in sections with the extremities thereof formed to constitute supporting arms, and the latter being provided with adjustable means adapted to be affixed to said main rim.

2. In a fruit gatherer, an elongated main frame including parallel members spaced apart by a rectangular frame arranged slightly to one side of the longitudinal middle, one end of said main frame being closed and the other end being open so as to receive a tree trunk between them, a transverse shaft supporting said main frame substantially at its longitudinal middle, a plurality of vertically and laterally extended arms mounted on said rectangular spacing frame, the arms being arranged in groups of two and connected by circular rim sections each group thus constituting a quadrant.

3. In a fruit gatherer, an elongated main frame including parallel members spaced apart by a rectangular frame arranged slightly to one side of the longitudinal middle, one end of said main frame being closed and the other end being open so as to receive a tree trunk between them, a transverse shaft supporting said main frame substantially at its longitudinal middle, a plurality of vertically and laterally extended arms mounted on said rectangular spacing frame, the arms being arranged in groups of two and connected by circular rim sections thus constituting quadrants, the adjacent sides of the groups over the open end of said frame being spaced apart so that the arms are substantially superimposed above the parallel members.

ARTHUR E. HEDEEN.